(12) United States Patent
Bartkowiak

(10) Patent No.: US 6,574,334 B1
(45) Date of Patent: Jun. 3, 2003

(54) EFFICIENT DYNAMIC ENERGY THRESHOLDING IN MULTIPLE-TONE MULTIPLE FREQUENCY DETECTORS

(75) Inventor: John G. Bartkowiak, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/160,417

(22) Filed: Sep. 25, 1998

(51) Int. Cl.[7] .................................................. H04M 1/15
(52) U.S. Cl. ........................ 379/386; 370/526; 708/312; 324/76.57
(58) Field of Search .................... 379/386; 370/526; 708/311, 312; 324/76.57; 84/454

(56) References Cited

U.S. PATENT DOCUMENTS

| | | | |
|---|---|---|---|
| 4,689,760 A | 8/1987 | Lee et al. ..................... | 370/526 |
| 5,253,326 A | 10/1993 | Yong ............................. | 395/2 |
| 5,325,427 A * | 6/1994 | Dighe .......................... | 379/386 |
| 5,450,490 A | 9/1995 | Jensen et al. ................ | 380/253 |
| 5,764,763 A | 6/1998 | Jensen et al. ................ | 380/253 |
| 5,774,849 A | 6/1998 | Benyassine et al. ......... | 704/246 |
| 5,911,128 A | 6/1999 | DeJaco ........................ | 704/221 |
| 5,953,696 A | 9/1999 | Nishiguchi et al. .......... | 704/209 |
| 5,974,373 A | 10/1999 | Chan et al. .................. | 704/200 |
| 6,229,889 B1 | 5/2001 | Cannon et al. .............. | 379/386 |

OTHER PUBLICATIONS

U.S. App. No. 09/160,415, filed Sep. 25, 1998, entitled "Tone Detector with Noise Detection and Dynamic Thresholding for Robust Performance," naming John G. Bartkowiak, inventor, 32 pp.

Alan V. Oppenheim and Ronald W. Schafer, "Discrete–Time Signal Processing", Prentice Hall Signal Processing Series, pp. 585–587.

\* cited by examiner

Primary Examiner—Forester W. Isen
Assistant Examiner—Daniel Swerdlow
(74) Attorney, Agent, or Firm—Zagorin, O'Brien & Graham LLP

(57) ABSTRACT

An apparatus for determining energy threshold detection values for detecting at least one tone having a known frequency and duration in an input signal. The input signal is input over a period of time that is divided into frame portions including at least an initial frame portion and a last frame portion. An energy value is determined for the at least one tone during each frame portion. A set of control flag signals are set for the at least two frame portions based on the energy values being below a threshold value in previous frame portions and the presence of noise in previous frame portions. An offset into a data table is determined based on the control word, the offset being used to retrieve a scaling coefficient and an address of an energy value for the at least two frame portions from the data table. A second set of control flag signals provide information on the number of comparisons to energy values from previous frames that are required to determine the energy threshold detection value for each frame portion.

38 Claims, 7 Drawing Sheets

EFFICIENT DYNAMIC ENERGY THRESHOLDING IN MULTIPLE-TONE MULTIPLE FREQUENCY DETECTORS

BACKGROUND OF THE INVENTION

1. Field of the Invention

This invention relates to communications systems and more particularly relates to a method and apparatus to efficiently implement dynamic thresholding in tone detectors utilizing data tables and shared decision paths.

2. Description of the Related Art

Communication systems often utilize a loop to connect terminal equipment such as telephone instruments, facsimile machines, private branch exchanges, key telephone systems, voice mail systems, modems, computers, alarm systems, radio controlled systems and telephone answering machines as well as many other devices. These devices are often referred to as Customer Premises Equipment ("CPE"). To perform various signaling applications such as telephone dialing, data entry, caller ID, and storage system control, Dual-Tone Multiple Frequency ("DTMF") signals are often used. A DTMF signal is defined by two superimposed sinusoidal waveforms with frequencies generally chosen within the voice band.

Detection of multiple-tone, multiple frequency (MTMF) signals, such as Dual-Tone Multiple Frequency (DTMF) signals, in environments where one or more noise signals is present is generally recognized by those of ordinary skill in the art to be a complex issue. Detection of MTMF signals is particularly difficult when the noise signals share the voiceband used for inband MTMF signaling. One source of noise interference which impedes DTMF detection is referred to as "talk-off". Talk-off occurs whenever a signal tone detector erroneously accepts signal imitations, such as those produced by speech or music, as valid signals. These noise signals can imitate some of the temporal and spectral characteristics of signaling tones. These imitations are likely to trigger, or talk-off, signal tone detectors. An important goal in designing such detectors is making them immune to these signal imitations.

An additional problem with signal tone recognition is that signaling tones must, in some situations, compete with speech, music or other extraneous background noise. The existence of these complex noise signals introduces spectral components into the signal to be recognized that distort and ultimately impair the detection of valid signaling tones. A signal detector is said to have been "talked down" whenever it fails to recognize valid signaling tones that were masked by noise signals such as speech, music or noise.

SUMMARY OF THE INVENTION

In one embodiment, the present invention provides an apparatus for determining energy threshold detection values for detecting at least one tone having a known frequency and duration in an input signal. The input signal is input over a period of time that is divided into frame portions including at least an initial frame portion and a last frame portion. An energy value is determined for the at least one tone during each frame portion. A set of control flags are set for the at least two frame portions based on the energy values being below a threshold value in previous frame portions and the presence of noise in previous frame portions. An offset into a data table is determined based on the control word, the offset being used to retrieve a scaling coefficient and an address of an energy value for the at least two frame portions from the data table. A second set of control flags provide information on the number of comparisons to energy values from previous frames that are required to determine the energy threshold detection value for each frame portion.

In another embodiment, the present invention provides a system for detecting at least one tone having a known frequency and duration in an input signal. The input signal is input over a period of time that is divided into substantially equal frame portions. The system generates energy values indicative of the energy of the input signal during each frame portion, and energy values indicative of the energy of the at least one tone during each frame portion. A signal filter receives the energy values and generates noise indicators for each frame portion based on the energy values. A dynamic threshold determiner generates an energy threshold for each frame portion based on scaling coefficients and addresses of the energy values for at least one frame portion. The scaling coefficients and address of the energy values are stored in a data table. Control flags, that are set based on the energy values being below a threshold value in previous frame portions and the presence of noise in previous frame portions, are determined for the at least one frame portion. The dynamic threshold determiner generates an offset into the data table based on the control flags, and retrieves a scaling coefficient and an address of an energy value from the data table based on the offset. A signal processor determines when the input signal includes the at least one tone based on the energy threshold, the noise indicator, and the energy value.

Another embodiment of the present invention detects a plurality of tones having known frequencies and duration in an input signal. The input signal is input over a period of time that is divided into at least four substantially equal frame portions. Energy values are determined for at least two of the tones during each frame portion. A signal filter receives the energy values and generates noise indicators for each frame portion based on the energy values. A dynamic threshold determiner generates an energy threshold for third and fourth frame portions based on scaling coefficients and addresses of the energy values for previous frame portions. The scaling coefficients and addresses of the energy values are stored in a data table. The energy threshold detection value for the initial frame portion is based on an expected energy level and whether noise is present in the input signal. The energy threshold detection values for the second frame portion is based on a scaled value of the energy value from the initial frame portion. A control word, incorporating a set of control flags that are set based on the energy values being below a threshold value in previous frame portions and the presence of noise in previous frame portions, is determined for third and fourth frame portions. The dynamic threshold determiner generates an offset into the data table based on the control word, and retrieves a scaling coefficient and an address of an energy value from the data table based on the offset. The offset is determined by masking selected bits in the control word. A second set of control flags located in the least significant bits of the scaling coefficients are set based on the number of comparisons against previous frame values required to determine the energy threshold detection values for third and fourth frame portions, the second set of control flags being set based on the presence of noise and on the energy values being below a threshold value in previous frame portions. The dynamic threshold determiner further compares the energy threshold detection value for subsequent frame portions to previous energy values based on the second set of control flags to determine if the energy threshold detection value is in-range of previous energy values. A signal processor determines when the input signal includes the at least one tone based on the energy threshold, the noise indicator, and the energy value.

BRIEF DESCRIPTION OF THE DRAWINGS

The tone detector may be better understood, and its numerous objects, features, and advantages made apparent to those skilled in the art by referencing the accompanying drawings.

The use of the same reference symbols in different drawings indicates similar or identical items.

DETAILED DESCRIPTION

The present method and apparatus provides an efficient data structure for determining dynamic threshold energy values that are used in co-pending U.S. Patent Application entitled, "Tone Detector With Speech Detection And Dynamic Thresholding for Robust Performance", (hereinafter, "tone detector"), U.S. application Ser. No. 09/160,415, filed Sep. 25, 1998, which is assigned to the same assignee as the tone detector and is hereby incorporated by reference. The present invention may be applied in a variety of situations to enhance detection of inband signals.

Figure 1:
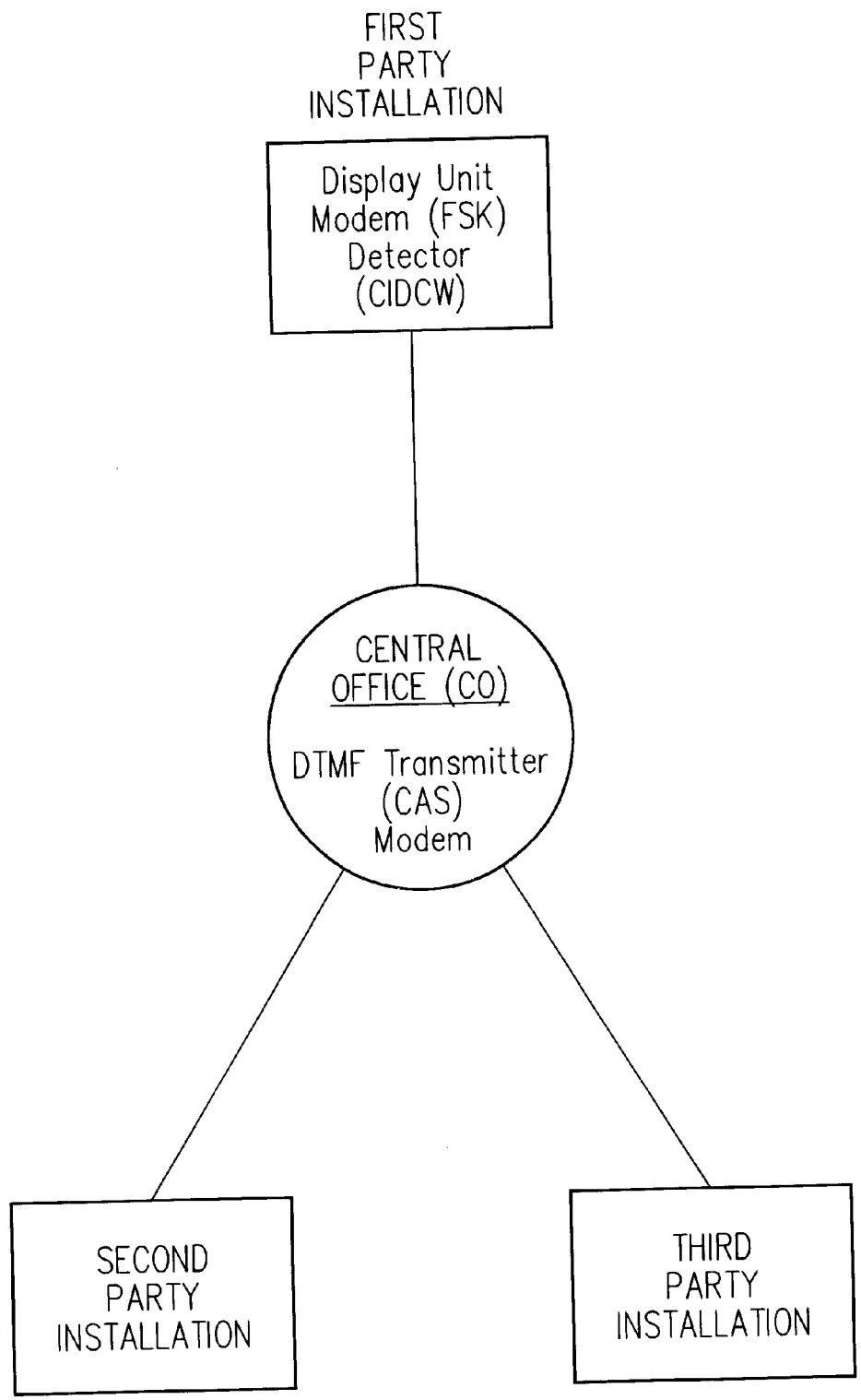
FIG. 1 is a block diagram of an example of an application of the tone detector.

For example, the present invention may be applied to a group of services known as Caller Identity Deliver on Call Waiting (CIDCW), which requires reliable signal detection in an adverse signaling environment. A typical installation for CIDCW is shown in FIG. 1. The CIDCW service provides caller identification information to the subscriber for calls that arrive while the subscriber is using the equipment. In a typical situation, a first party and a second party have a connection established between them. The first party subscribes to CIDCW. Call waiting gives the first party the option of answering the incoming call while putting the second party on hold, or answering the incoming call after terminating the connection with the second party. When a third party attempts to call the first party, the third party receives audible ringing upon completion of dialing the first party's number. A Central Office (CO) switch recognizes that the call is destined for the first party and executes the CIDCW service routine. The CO switch splits the connection and, consequently, mutes the second party. The CO sends the regular call waiting signal, a 440 Hz tone of approximately 300 milliseconds duration, to the first party and it appends a short burst of a special alerting signal, the Customer Premises Equipment Alerting Signal (CAS), to the call waiting signal to prompt the first party's equipment. The equipment must reliably detect this alerting signal so that the subscriber's handset and any other parallel extension handset is muted upon receiving the signal. An acknowledgment signal is sent back to the CO, and the first party's equipment places a frequency-shift keying (FSK) data receiver, such as a modem, on the line awaiting the caller identification information. The first party's equipment then receives the data, decodes the information, and displays it for the subscriber to view. The connection between the first and second party is then re-established once data transmission is complete.

The reliability of CIDCW service depends on the accuracy with which the alerting signal is detected by the subscriber's equipment. Since a DTMF signaling scheme was chosen for this service, the problem of talk-off and talk-down may cause the following problems:

1. If the subscriber's detector incorrectly accepts a noise signal, such as signal imitation produced by speech (talk-off), the Customer Premises Equipment (CPE) will interrupt the connection by muting the handset and any extension handsets, and will send back an acknowledgment signal at a relatively high amplitude in comparison to what the subscriber normally hears on the line. The connection between the first and second parties remains interrupted until the CPE times out waiting for data from the CO. Since the CO did not originate the alerting signal, and therefore did not split the connection between the first and second parties or mute the second party, the second party will unintentionally receive the acknowledgment signal at an undesirable listening level.

2. Alternatively, if the CPE is talked-down and fails to recognize an alerting signal sent by the CO, no caller identification information will be delivered and the service paid for by the subscriber will not be rendered. In both cases, detector failure degrades the quality of the service.

Since both talk-off and talk-down have negative consequences, it is desired to minimize such occurrences. Also, the alerting signal can be sent at any time while the first and second parties are connected, and the CAS detector must therefore remain on the line for the entire duration of the call. During this time, the detector is constantly exposed to noise signals including speech with the consequent possibility of talk-off. Since talk-off degrades the voice signals, repeated talk-offs in relatively short time periods should be avoided.

Figure 2:
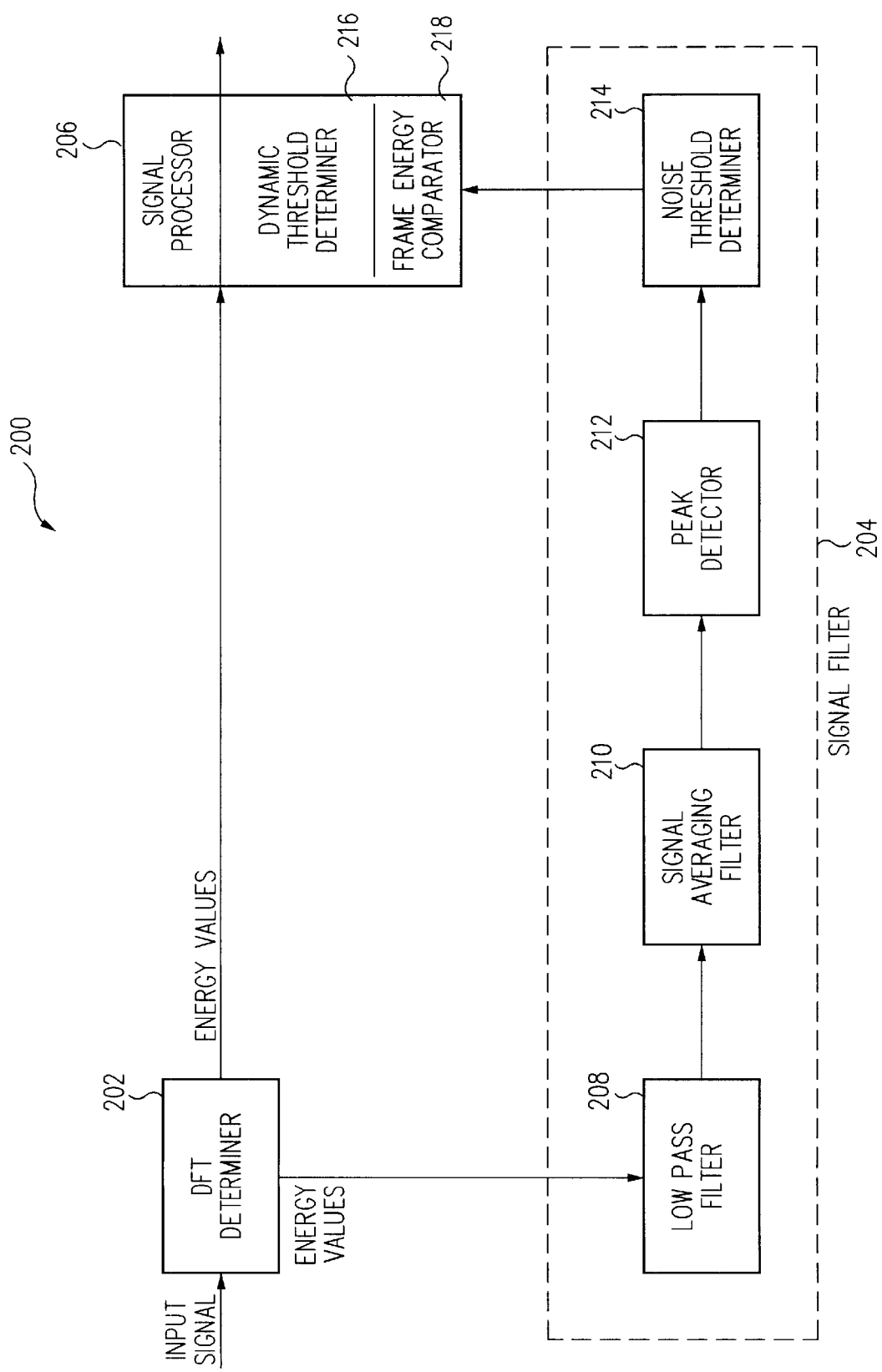
FIG. 2 is a block diagram of components included in the tone detector.

FIG. 2 is a block diagram of components included in signal tone detector 200 for detecting multiple-tone, multiple frequency signals, such as DTMF signals, including DFT determiner 202, signal filter 204, and signal processor 206. To illustrate application of these components to the CIDCW example, a DTMF frequency combination of 2130 Hz and 2750 Hz for the CAS signal is used. Examples of acceptable parameter limits are:

Lower Tone: 2130 Hz+/−0.5%

Upper Tone: 2750 Hz+/−0.5%

Dynamic Range: −14 to −32 decibel milliwatts (dBm) per tone

Power Differential within Dynamic range: 0 to 6 decibels (dB) between tones

Signal duration at Customer Premises Equipment: 75 to 85 ms.

It is recognized that other applications utilizing the tone detector may involve different components having different functionality, different frequencies, and different parameter limits. The values being used to illustrate a CIDCW example are not meant to limit the tone detector to a particular application, number of frequencies, set of frequencies, or set of parameters. It is also recognized that the tone detector may be applicable to decode signals containing more than two tones.

DFT Determiner

Detecting the CAS signal involves extracting two tones in the DTMF input signal and determining that their duration is within the specified limits, with or without the presence of noise signals. The present signal tone detector 200 uses DFT determiner 202 to transform the input time-domain signal into its frequency-domain equivalent by means of the Discrete Fourier Transform (DFT). There are several known methods for generating the DFT of a signal that may be applied to the present invention. One method is known as the Goertzel algorithm, which is described in numerous publications on signal processing including "Introduction To Digital Signal Processing", J. G. Proakis, D. G. Manolakis, MacMillan Publishing. It is recognized that other known Fourier transform algorithms may be used in DFT determiner 202.

The sampling frequency F used in a telephone network is approximately 8 kHz. In the present example, the CAS tone duration is 75–85 ms, which is equivalent to 600–680 samples at the 8 kHz sampling frequency. A frame detection length of approximately 150–170 samples allow the tone detector to perform detection on four consecutive frames of the tones present in the input signal. The number of frames will vary depending on the sampling frequency and the duration of the tones. The preferred embodiment includes four frames, however other embodiments having at least two frames, including an initial frame and a last frame, may be utilized.

Signal Filter

Once the DFT for the input signals is determined using a suitable method, the tone detector 200 uses signal filter 204 to determine the presence of noise in the input signal. Various known signal filters may be utilized in the present invention, with signal filter 204 being provided as one example. An embodiment of signal filter 204 includes low-pass filter 208 cascaded with signal averaging filter 210, peak detector 212, and noise threshold determiner 214. In the CIDCW example, low pass filter 208 filters out at least a portion of the CAS tones from the input signal while retaining a substantial portion of the extraneous noise in the output signal. Signal averaging filter 210 provides a running average value of the output of low pass filter 208. Peak detector 212 provides the largest absolute value output by signal averaging filter 210 for each frame. Signal filter 204 is reset at the beginning of every frame to allow individual frames to be categorized as to whether they contain noise signals such as speech. Noise threshold determiner 214 determines if the peak value is greater than a lower threshold for a particular frame and sets a noise indicator signal for that frame, to indicate the presence of a noise signal. It is recognized that other filtering schemes may be utilized in signal filter 204 instead of, or in addition to, the low pass filter 208, signal averaging filter 210, peak detector 212, and noise threshold determiner 214.

Signal Processor

Energy threshold detection levels are determined individually for both the 2130 Hz and 2750 Hz tones in the Customer Premises Equipment Alerting Signal (CAS). Regardless of which tones are detected in a particular application, however, the present invention checks the energy of each tone for the current frame against the energy detected in a previous frame for an "in-range" condition. During tone detection, if noise is not present in the input signal, the energy value output from DFT determiner 202 for the tones will have similar energy values between frames.

In the CIDCW example, the input signal to the detector 200 is a CAS tone at −32 dBm with a duration of 80 milliseconds, or 640 samples at 8 kHz sampling rate. Signal processor 206 includes band pass filters for generating energy values of tones that are to be detected, such as the CAS tones at 2130 Hz and 2750 Hz in the CIDCW example. Note that, although the final energy calculation for the 2750 tone is done at sample count 160. Since the 2750 Hz tone uses less samples to calculate the final frame energy, a normalization of this final energy value is required so that energy comparisons for the 2130 and the 2750 Hz tone are meaningful. This is achieved by multiplying the final 2750 frame energy by the factor:

$$(169/160)^2 = 1.115664063$$

Energy values for two or more tones at different frequencies that are to be detected may be similarly normalized using frequencies that are appropriate for the particular tones involved.

The initial threshold detection value for frame 0 is based on the lowest possible signal level that tone detector 200 must deal with since the signal level is, at this time, unknown. However, subsequent frames employ energy detection levels from previous frames to set minimum thresholds for progressive detection in subsequent frames. An embodiment of the present invention utilizes an energy determination method in which an analog signal is received. A stream of data samples is created from the received analog signal. Based on the stream of data samples, a duration is calculated for one or more analog frequencies contained within the received analog signal. The duration is calculated for the one or more frequencies by utilizing a calculated signal energy for each of the one or more analog frequencies. The calculated signal energies for each of the one or more analog frequencies are used to determine a number of frequency-specific data samples. The number of frequency-specific data samples are then utilized with a sampling rate to calculate the duration of the each of the one or more analog frequencies. The one or more calculated durations of each of the one or more analog frequencies are utilized to determine whether the analog signal, composed of the one or more analog frequencies of defined duration, is present.

Table 1 is an example of tone energy levels in frames 0 through 3 for the CIDCW CAS example when noise, such as speech, is present. In frame 1, the 2750 Hz tone energy is much greater than the energy for the 2130 Hz tone due to the fact that the speech component of the input signal contains energy at the same frequency, and in phase with, the CAS 2750 Hz tone. In frame 2, the equivalent effect has occurred in both the 2130 and 2750 Hz tones with in-phase energy from the speech component of the input signal at those frequencies boosting the energy content of peak detector 210. In frame 3, the 2130 Hz tone energy has suffered a "dropout" apparently caused by out-of-phase energy at that frequency being present in the input signal, which cancels the energy from the 2130 Hz tone. In contrast, the 2750 Hz energy has again been boosted by the presence of in-phase signal at that frequency in the speech component of the input signal. A dropout occurs when the energy for the entire frame portion is below a threshold, or when a linearly increasing energy count for a subframne falls below a count threshold, as described in co-pending U.S. Patent Application entitled "Measurement of Linearly Increasing Subframe Energies Improves Talk-off and Talk-down Performance of Dual-Tone Multiple Frequency Detectors", incorporated by reference hereinabove.

TABLE 1

| Frame # | 2130 Hz energy | 2750 Hz energy |
|---|---|---|
| 0 | 32 | 40 |
| 1 | 35 | 144 |
| 2 | 109 | 80 |
| 3 | 4 | 94 |

Signal processor 206 includes dynamic threshold determiner 216 which generates an energy threshold detection value for each tone to be detected in each frame based on whether there is noise in the input signal and whether a dropout of the tone occurred in the frame immediately preceding the current frame. Frame energy comparator 218 checks an energy value for the current frame against the energy value in a previous frame for an "in-range" condition. Frame energy comparator 218 may be a separate portion of signal processor 206 or a sub-portion of dynamic threshold determiner 216. FIGS. 3 through 6 illustrate the operation of dynamic threshold determiner 216 and frame energy comparator 218 for respective frame portions 0 through 3 for the CAS example. It is important to note, however, that the principles used in these figures may be modified accordingly to detect tones having different frequencies, duration, and energy levels, and to situations involving a different number of frame portions.

Figure 3:
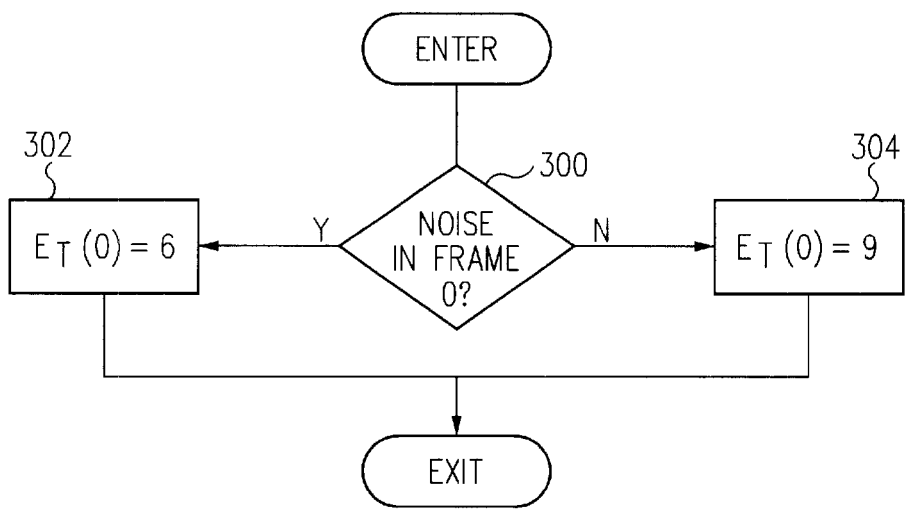
FIG. 3 is a flowchart diagram for determining a dynamic energy threshold for an initial frame.

FIG. 3 shows in a flowchart an example of determining the energy threshold detection level for the initial frame, denoted as $E_T(0)$ for frame 0. In block 300, it is determined whether the noise indicator is set to a value indicating that noise is present in the input signal for this frame. If so, the energy threshold is set to a constant value based on an expected energy level. In this example, the value of 6 is used in block 302. If no noise is detected in the input signal in frame 0, the threshold energy value $E_T(0)$ is set to a constant value based on another expected energy level in block 304, such as 9 in this example. The values for the expected energy of 6 and 9 used in this example approximate the energy present in half of a frame for the lowest tone energy that the system is designed to detect. In this example, the lowest signal level is set at −32 dBm with no noise present, which gives a detector 200 output of approximately 36 for the 2750 Hz tone. The energy in half the frame is $(85/169)^2 * 36 = 9$. A similar calculation for the lowest signal level expected with noise is made to determine the threshold energy value of 6. No comparison to the energy values from previous frame portions is made in this frame portion since frame 0 is the initial frame being processed.

Signal processor 206, or some other component in detector 200 separates a substantial portion of the energy signal corresponding to the particular tone frequency to be detected from the remaining portion of the energy signal. A suitable structure for generating the particular tone signal may be a type of known signal filter, such as a band pass filter, for passing signals having a particular frequency.

Figure 4:
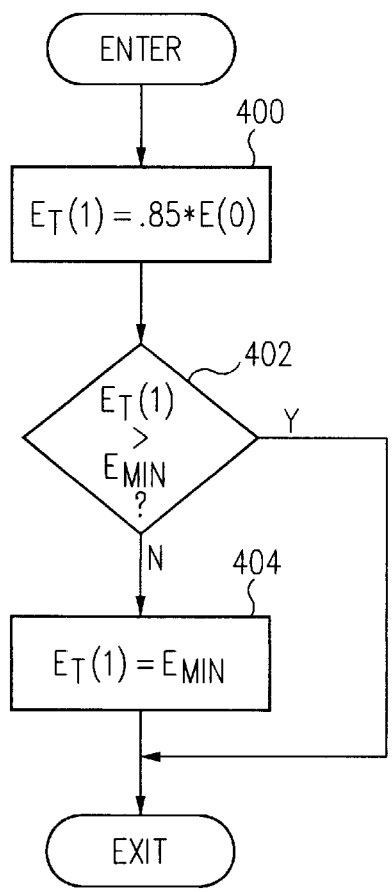
FIG. 4 is a flowchart diagram for determining a dynamic energy threshold for a second frame.

FIG. 4 shows in a flowchart how the energy threshold detection level is determined for a subsequent frame portion, denoted as frame 1. In block 400, the energy threshold $E_T(1)$ is a scaled portion of the energy value for the previous frame. A scaling value of 0.85 was experimentally determined to provide acceptable results in the CAS example. In block 402, a check is made to determine if the resulting energy threshold level is equal to a minimum value in block 402. If not, then the energy threshold level is set to the minimum value in block 404. The energy value for a tone in frame 1, $E_T(1)$, may be determined in another portion of signal processor 206.

Figure 5:
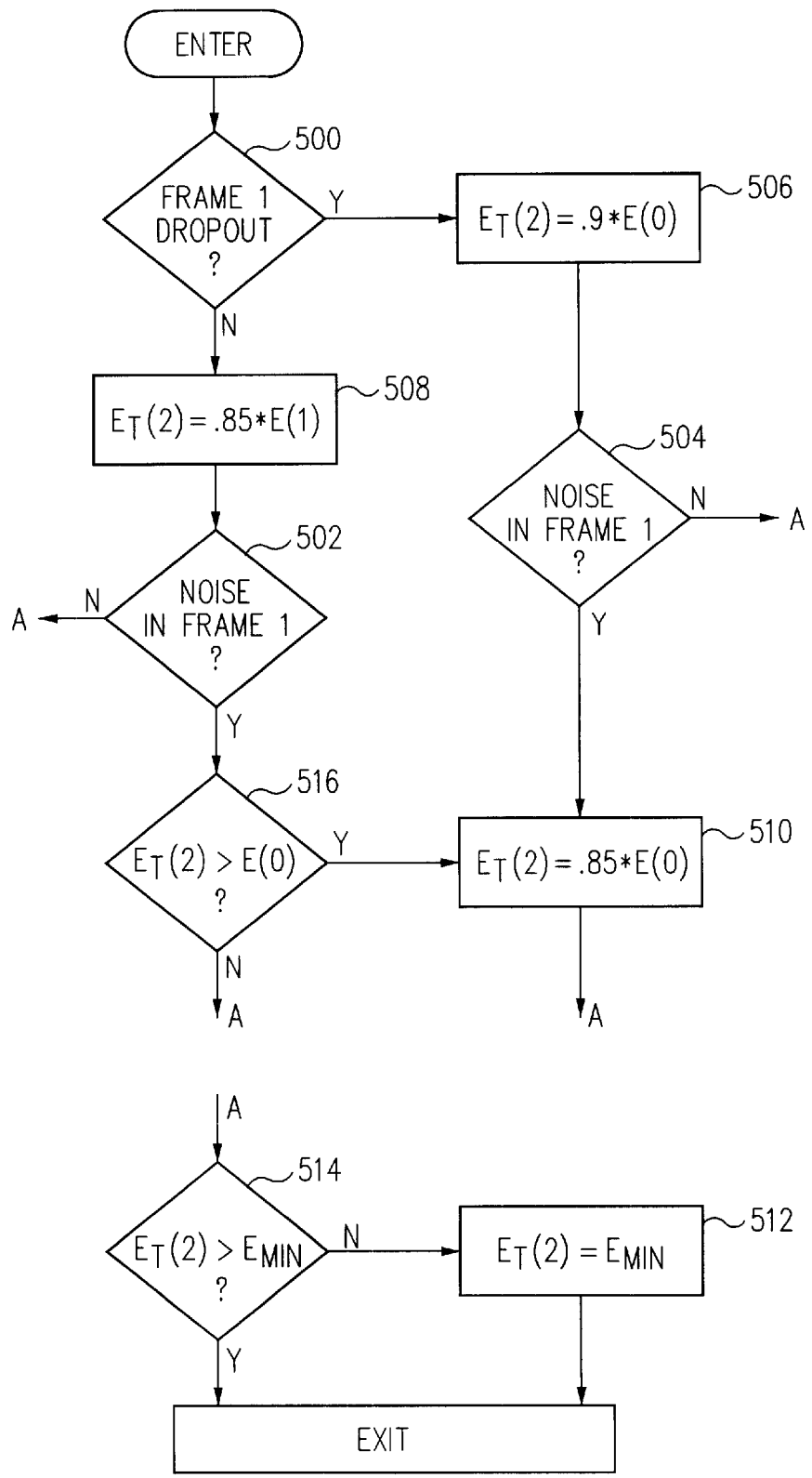
FIG. 5 is a flowchart diagram for determining a dynamic energy threshold for a third frame.
Figure 6:
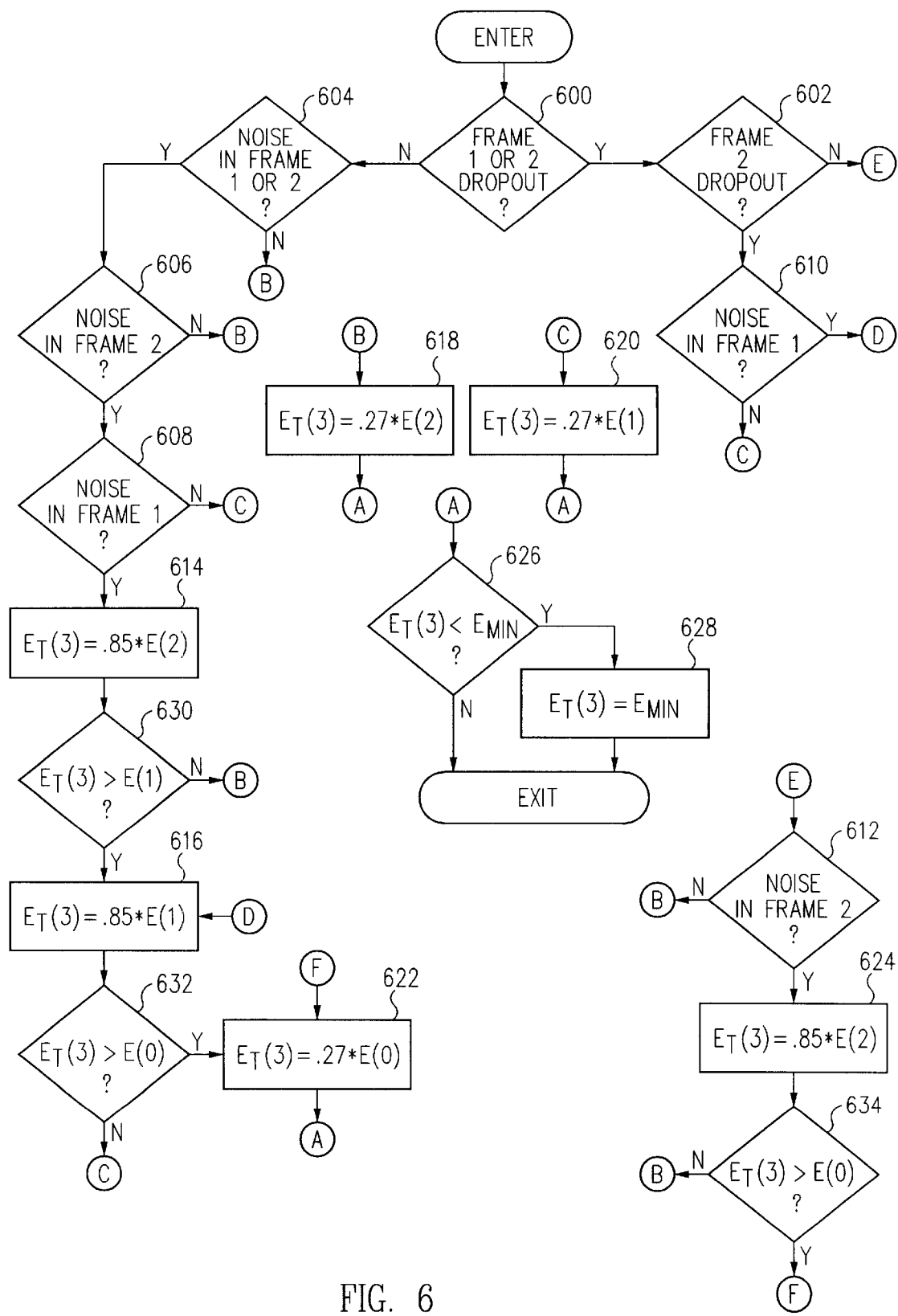
FIG. 6 is a flowchart diagram for determining a dynamic energy threshold for a fourth frame.

FIGS. 5 and 6 show in a flowchart that the energy threshold detection levels for frames 2 and 3, denoted as $E_T(2)$ and $E_T(3)$, respectively, are determined based on energy values of previous frames, whether energy dropouts occurred in previous frames, and whether noise was present in previous frames. Parameters for generating scaled values of previous frame energy values are stored in a data table. The scaled values are used to determine if an energy threshold value is within range. Parameters are chosen based on whether the signal energy "dropped out" in any of the previous frames, as shown in block 500 in FIG. 5 and in blocks 600 and 602 in FIG. 6. Parameters are also chosen based on whether noise was present in a particular frame, as shown in blocks 502 and 504 in FIG. 5, and blocks 604, 606, 608, 610, and 612 in FIG. 6. The paradigm used for the CAS example allows only a single energy dropout during the four frames. Thus, in frame 3 of the CAS example, if a dropout occurs for any of the frequencies in more than one frame portion, the detection process fails. A different number of dropouts may be allowed, depending on the particular application utilizing the present invention. The logic in FIGS. 5 and 6 would be changed accordingly to accommodate the number of dropouts allowed.

Tables 2 and 3 show parameter data tables for frames 2 and 3 for the 2130 Hz tone. Similar tables are generated for the 2750 Hz tone. The scaling coefficients multiply energy values from previous frames, such as E(0), E(1), and E(2) to determine energy threshold detection values $E_T(2)$ and $E_T(3)$, depending on the frame portion being processed. The decision logic for determining $E_T(2)$ is shown in blocks 506, 508, and 510 in FIG. 5, and in blocks 614, 616, 618, 620, 622, and 624 in FIG. 6 for determining $E_T(3)$.

Once a tentative value for the energy threshold detection values is determined for a frame portion, it is compared to energy values from previous frames as shown in block 516 in FIG. 5 and blocks 630, 632, and 634 in FIG. 6 to ensure that the detection value is in-range. This is because the energy value from a previous frame may have been affected by the presence of noise energy at the specific frequencies being monitored by the detector. In FIG. 5, the energy threshold detection value for frame 2, $E_T(2)$, is set to a minimum energy value ($E_{MIN}$) in block 512 if it is below the minimum value $E_{MIN}$ in block 514. A similar test is performed for the energy threshold detection value for frame 3, $E_T(3)$, in blocks 626 and 628 in FIG. 6.

When the number of frame portions processed is greater than four, a greater number of previous frames are tested to determine if noise was present or if there were dropouts. Likewise, the number of scaling coefficients and address values increases compared to Tables 2 and 3 for the CAS example.

TABLE 2

2130 Hz Tone Energy Threshold Detection
Coefficient and Energy Address Data For Frame 2

16-bit scaling
coefficient

| Word | Decimal/Hexadecimal | Address | Comments |
|---|---|---|---|
| 0 | 0.849/6CCC | | coefficient for no dropout or noise in frame 1 |
| 1 | | 2130_E(1) address | 2130_E(1) because no dropout in frame 1 |
| 2 | 0.85/6CCE | | coefficient for noise but no dropout in frame 1 |
| 3 | | 2130_E(1) address | 2130_E(1), then 2130_E(0) |
| 4 | 0.9/7443 | | coefficient for no noise but dropout in frame 1 |
| 5 | | 2130_E(0) address | 2130_E(0) because dropout in frame 1 |
| 6 | 0.849/6CCC | | coefficient for noise and dropout in frame 1 |
| 7 | | 2130_E(0) address | 2130_E(0) because dropout in frame 1 | where:

E(0) address=physical memory address at which frame 0 energy is located

E(1) address=physical memory address at which frame 1 energy is located

E(2) address=physical memory address at which frame 2 energy is located

TABLE 3

2130 Hz Tone Energy Threshold Detection Coefficient and Address Data For Frame 3

| Word | 16-bit scaling coefficient Decimal/Hexadecimal | Address | Comments |
|---|---|---|---|
| 0 | 0.273/22E4 | | coefficient for no dropout and noise |
| 1 | | 2130_E(2) address | 2130_E(2) because no noise |
| 2 | 0.273/22E4 | | coefficient for noise in frame 2 |
| 3 | | 2130_E(1) address | 2130_E(1) because noise in frame 2 |
| 4 | 0.273/22E4 | | coefficient for noise in frame 1 |
| 5 | | 2130_E(2) address | 2130_E(2) because noise in frame 1 |
| 6 | 0.85/6CCD | | coefficient for noise in both frames |
| 7 | | 2130_E(2) address | 2130_E(2), then 2130_E(1), then 2130_E(O) |
| 8 | 0.273/22E4 | | coefficient for no noise and dropout in frame 1 |
| 9 | | 2130_E(2) address | 2130_E(2) because dropout in frame 1 |
| 10 | 0.85/6CCE | | coefficient for noise in frame 2 and dropout in frame |
| 11 | | 2130_E(2) address | 2130_E(2), then 2130_E(0) |
| 12 | 0.273/22E4 | | coefficient for noise and dropout in frame 1 |
| 13 | | 2130_E(2) address | 2130_E(2) because dropout in frame 1 |
| 14 | 0.85/6CCE | | coefficient for noise in both frames and dropout in frame 1 |
| 15 | | 2130_E(2) address | 2130_E(2), then 2130_E(0) |
| 16 | 0.273/22E4 | | coefficient for no noise, but dropout in frame 2 |
| 17 | | 2130_E(1) address | 2130_E(1) because dropout in frame 2 |
| 18 | 0.273/22E4 | | coefficient for noise and dropout in frame 2 |
| 19 | | 2130_E(1) address | 2130_E(1) because dropout in frame 2 |
| 20 | 0.85/6CCE | | coefficient for noise in frame 1 and dropout in frame 2 |
| 21 | | 2130_E(1) address | 2130_E(1), then 2130_E(0) |
| 22 | 0.85/6CCE | | coefficient for dropout in frame 2 and noise in both frames |
| 23 | | 2130_E(1) address | 2130_E(1), then 2130_E(0) |

To reduce the complexity of the decision paths when data from two or more previous frame portions must be tested, the present invention provides a novel look-up table and decode technique to replace the flow diagrams in FIGS. 5 and 6. Additionally, although the frame 3 data table is much more complex than frame 2, an embodiment of the present invention utilizes the same control code in situations when two or more previous frame portions are involved to further minimize the resources required for implementation. A set of control flag signals indicate the status of parameters related to the detection process. The control flag signals are updated throughout the detection process for each of the frames and are used to retrieve information from the parameter data tables, such as Tables 2 and 3 hereinabove. In a situation such as the CAS example, where two tones are to be detected over four frame portions, these control flags are specified by a 9-bit control word arranged as follows:

Bits 8–7: frame 1 general dropout flags

Bits 6–5: frame 2 general dropout flags

Bit 4: frame 2 energy dropout flag

Bit 3: frame 1 energy dropout flag

Bits 2–0: noise presence flags for frame 1, frame 2, and current frame, respectively.

General dropout flags, bits 8–7 and 6–5, are defined as

00: no dropout

01: 2130 Hz tone dropout

10: 2750 Hz tone dropout

11: 2130 and 2750 Hz tone dropout.

These flags are used to obtain dynamic energy threshold values for each frame portion. When only one tone is to be detected, control flags for only one tone are required. When more than two tones are to be detected, a correspondingly greater number of control flags are required. The number of control flags required also depends on the number of frame portions to be processed. The procedure for obtaining the appropriate energy threshold for frames 2 and 3 for the CAS example is now described.

Frame 2 Thresholds

The condition of Bits 8–0 of the control word prior to the analysis of frame 2 is

| Bit # | 8–7 | 6–5 | 4 | 3 | 2 | 1 | 0 |
|---|---|---|---|---|---|---|---|
| | xy | 00 | 0 | 0/1 | 0/1 | 0 | 0/1 | where bits 8–7: xy=general dropout code shown above bits 4, 3: 0=no energy dropout; 1=energy dropout bits 2–0: 0=no noise in frame; 1=noise in frame These bits are used to generate an offset which is added to the start physical address of the appropriate data table. The following examples show how the control flags, also referred to as "bits" in the control word, are set.

EXAMPLE 1

In a first example, if no dropout has occurred in frame 1, but noise existed in both frame 1 and 2, the control flags have the following settings:

| Bit # | 8–7 | 6–5 | 4 | 3 | 2 | 1 | 0 |
|---|---|---|---|---|---|---|---|
| | 00 | 00 | 0 | 0 | 1 | 0 | 1 | bits 8–7 clear since no dropout in frame 1 bits 6–5 clear since not frame 3 threshold test bit 4 is clear since this is not frame 3 threshold test bit 3 is clear since there is no energy dropout in frame 1 bit 2 is set because noise was detected in frame 1 bit 1 is clear since it is not updated until threshold test for frame 2 is complete bit 0 is set because noise was detected in current frame (i.e. frame 2) Note that bit 1, which is the frame 2 noise flag, has not yet been updated. This is because the threshold value for frame 2 is decided upon using the past history of the detection and this does not include information from frame 2.

EXAMPLE 2

As a second example, when a 2130 Hz energy dropout has occurred in frame 1, and noise was detected in frame 1, but not in the current frame, the control flags have the following settings:

| Bit # | 8–7 | 6–5 | 4 | 3 | 2 | 1 | 0 |
|---|---|---|---|---|---|---|---|
| | 01 | 00 | 0 | 1 | 1 | 0 | 0 | bits 8–7=01 since some type of 2130 Hz tone dropout has occurred bits 6–5 clear since not frame 3 threshold test bit 4 is clear since not frame 3 threshold test bit 3 is set because the 2130 Hz tone dropout is an energy dropout bit 2 is set because noise was detected in frame 1 bit 1 is clear because not updated until threshold test for frame 2 is complete bit 0 is clear because no noise was detected in current frame 2

In the present invention each tone is processed separately to obtain an individual table offset value for frame portions where energy values from two or more previous frame portions are tested. The process for obtaining an offset value from the control word for the CAS example is shown in the flowchart in FIG. 7. In block 700, if bit 3 in the control word is set, a dropout in frame 1 occurred, and then, in block 702, bit 7 is checked to see which tone dropped out in frame 1. If bit 7 is set, then the 2130 Hz tone dropped out. In block 704, the 2750 Hz offset is set to the value of bits 1 and 2 in the control word and the 2130 Hz offset is set to the value of bits 1 through 4. If bit 7 is not set in block 702, then the 2750 Hz tone dropped out, and the 2130 Hz offset is set to the value of bits 1 and 2 in the control word and the 2750 Hz offset is set to the value of bits 1 through 4 as shown in block 714.

If bit 3 is not set in block 700, block 710 includes a test of whether bit 4 of the control word is set. If so, there was a dropout in frame 2 and, in block 712, bit 5 is checked to see which tone dropped out in frame 2. If bit 5 is set, then the 2130 Hz tone dropped out and, in block 704, the 2750 Hz offset is set to the value of bits 1 and 2 in the control word and the 2130 Hz offset is set to the value of bits 1 through 4. If bit 5 is not set, then the 2750 Hz tone dropped out, and the 2130 Hz offset is set to the value of bits 1 and 2 in the control word and the 2750 Hz offset is set to the value of bits 1 through 4 as shown in block 714.

If bit 3 is not set and bit 4 is not set, there were no dropouts in frame 1 or 2 and the offset for both of the tones is bits 1 through 4 of the control word as shown in block 716. When frame 2 is being processed (block 718), then both offset values are shifted 1 bit to the right as shown in block 720 to get the correct offset into the data table for frame 2.

Figure 7:
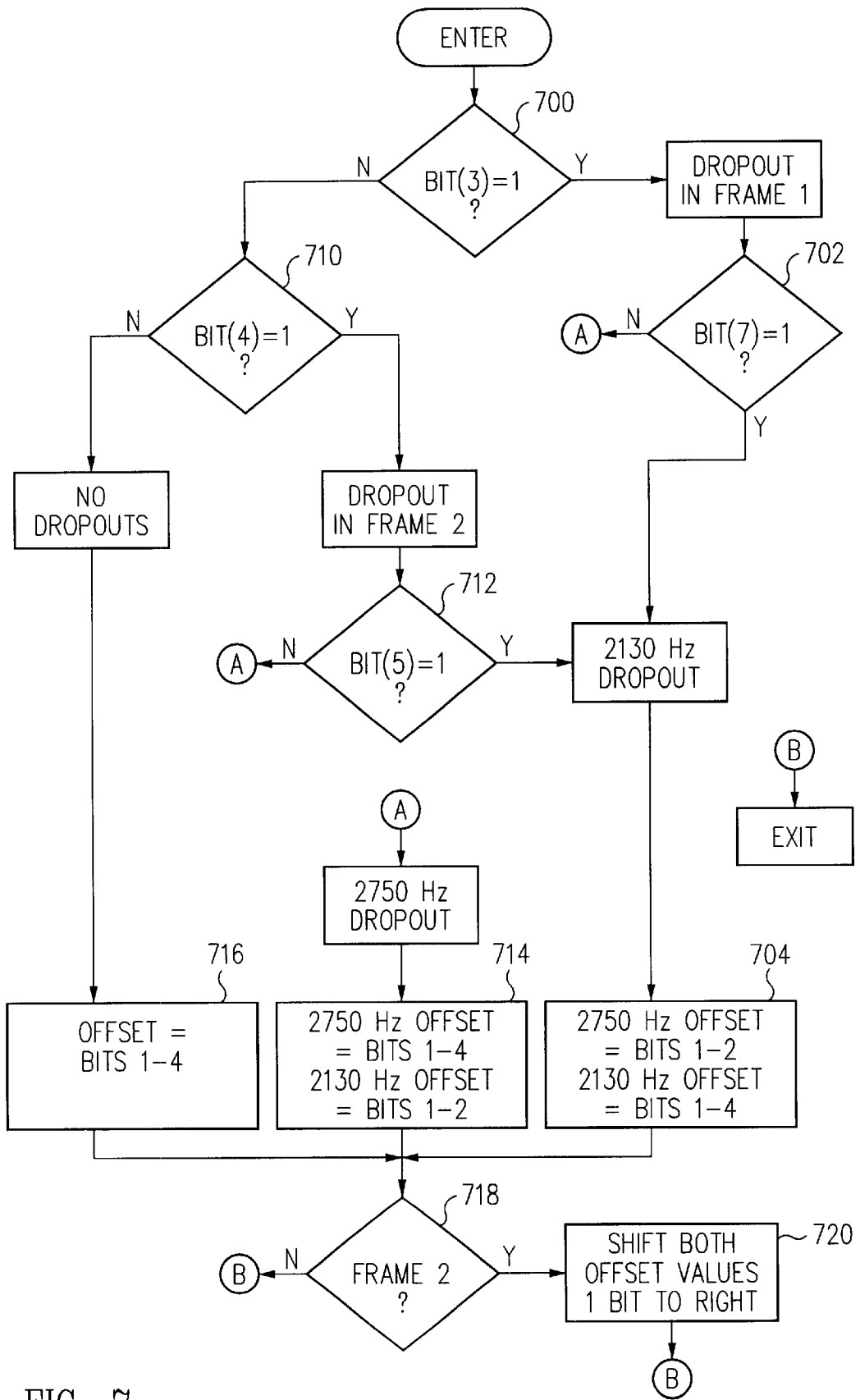
FIG. 7 is a flowchart diagram for determining an offset into a data table containing scaling coefficients and addresses of energy values for frame portions.

For Example 1, when no dropout has occurred in frame 1, but noise existed in both frames 1 and 2, the following offset codes result according to FIG. 7 for the 2130 Hz tone and 2750 Hz tone in frame 2:

| 2130 Hz tone offset | | | | | 2750 Hz tone offset | | | | |
|---|---|---|---|---|---|---|---|---|---|
| Bit # | 4 | 3 | 2 | 1 | 0 | Bit # | 4 | 3 | 2 | 1 | 0 |
| | 0 | 0 | 0 | 1 | 0 | | 0 | 0 | 0 | 1 | 0 |

Note that since it is a frame 2 threshold test, the final offset for each tone is shifted 1 place to the right as shown in blocks 718 and 720 in FIG. 7.

For Example 2, when a 2130 Hz energy dropout occurred in frame 1, and noise was detected in frame 1 but not in the current frame, the following table offset codes result according to FIG. 7 for the 2130 Hz tone and the 2750 Hz tone:

| 2130 Hz tone offset | | | | | 2750 Hz tone offset | | | | |
|---|---|---|---|---|---|---|---|---|---|
| Bit # | 4 | 3 | 2 | 1 | 0 | Bit # | 4 | 3 | 2 | 1 | 0 |
| | 0 | 0 | 1 | 1 | 0 | | 0 | 0 | 0 | 1 | 0 |

A 2130 Hz tone energy dropout occurred and since it is a frame 2 threshold test, the final offset for each tone is shifted 1 place to the right.

Using Table 2, the following parameters are selected with the offsets for the 2130 Hz and 2750 Hz tone threshold tests for Examples 1 and 2 above.

Example 1:

2130 Hz tone: coefficient 6CCE address=2130_E(1)

2750 Hz tone: coefficient=6CCE
    address=2130_E(1)

Example 2:

2130 Hz tone: coefficient=6CCC
    address=2130_E(0)

2750 Hz tone: coefficient=6CCE
    address=2130_E(1)

For Example 1, the offset for Table 2 is decimal number 2 for both tones. For Example 2, the offset for Table 2 is decimal number 6 for the 2130 Hz tone and decimal number 2 for the 2750 Hz tone. The offset is added to the physical address of the first value in Table 2 to retrieve the correct scaling coefficient. The offset is then incremented to retrieve the address of the frame energy to be used in the threshold test for frame 2, shown in FIG. 5. In an embodiment of the present invention, the same data table is used to store information for both the 2130 Hz and the 2750 Hz tones. The tone frame energy values are stored in an array having contiguous memory locations as shown in Table 4 and the address is incremented accordingly to retrieve the energy value for the tone being processed. For example, the address of the 2130 Hz frame energy is incremented by 1 to retrieve the 2750 Hz frame energy from Table 4.

TABLE 4

2130_E(0)
2750_E(0)
2130_E(1)
2750_E(1)
2130_E(2)
2750_E(2)
2130_E(3)
2750_E(3)

Frame 3 Thresholds

At the beginning of frame 3, control flags 0 through 8 will still be set from frame 2. The control flags are used during frame 3 to obtain the appropriate offset to add to the starting physical address of the data table for frame 3. This is illustrated in the following two examples.

EXAMPLE 3

If no dropout occurred in either frame 1 or frame 2, but noise was present in both frame 1 and frame 2, the control flags are set as follows:

| Bit # | 8–7 | 6–5 | 4 | 3 | 2 | 1 | 0 |
|---|---|---|---|---|---|---|---|
| | 00 | 00 | 0 | 0 | 1 | 1 | 1 | bits 8–7 are clear since no dropout in frame 1
bits 6–5 clear since no dropout in frame 2
bit 4 is clear since no energy dropout in frame 2
bit 3 is clear since no energy dropout in frame 1
bit 2 is set because noise detected in frame 1
bit 1 is set because noise detected in frame 2
bit 0 is set because noise detected in current frame

EXAMPLE 4

If a 2750 Hz energy dropout has occurred in frame 2, and noise was detected in frame 1 but not in frame 2 or the current frame

| Bit # | 8–7 | 6–5 | 4 | 3 | 2 | 1 | 0 |
|---|---|---|---|---|---|---|---|
| | 00 | 10 | 1 | 0 | 1 | 0 | 0 | bits 8–7 clear since no dropout in frame 1
bits 6–5=10 since a 2750 Hz tone dropout has occurred
bit 4 is set because the 2750 Hz tone dropped out
bit 3 is clear because no energy dropout in frame 1
bit 2 is set because noise was detected in frame 1
bit 1 is clear because no noise was detected in frame 2
bit 0 is clear because no noise was detected in current frame (i.e. frame 3)

Again, proceeding as shown in the flowchart of FIG. 7, for Example 3 above, results in the following table offset codes for the 2130 Hz tone and the 2750 Hz tone:

| 2130 Hz tone offset | | | | | 2750 Hz tone offset | | | | |
|---|---|---|---|---|---|---|---|---|---|
| Bit # 4 | 3 | 2 | 1 | 0 | Bit # 4 | 3 | 2 | 1 | 0 |
| 0 | 0 | 1 | 1 | 0 | 0 | 0 | 1 | 1 | 0 |

No dropouts occurred and since it is a frame 3 threshold test, the final offset for each tone is not right-shifted in block 720.

For Example 4 above, the following table offset codes for the 2130 Hz tone and the 2750 Hz tone are:

| 2130 Hz tone offset | | | | | 2750 Hz tone offset | | | | |
|---|---|---|---|---|---|---|---|---|---|
| Bit # 4 | 3 | 2 | 1 | 0 | Bit # 4 | 3 | 2 | 1 | 0 |
| 0 | 0 | 1 | 0 | 0 | 1 | 0 | 1 | 0 | 0 |

A 2750 Hz tone energy dropout occurred and since it is a frame 3 threshold test, the final offset for each tone is not right-shifted.

For Example 3, the offset code for Table 3 is decimal 6 in both cases. This offset is added to the physical address of the first value in the parameter data table, such as Table 3, to retrieve the correct scaling coefficient for frame 3. The offset is then incremented to provide the address of the frame energy to be used in the threshold test for frame 3, resulting in the parameters shown below:

2130 Hz tone: coefficient=Hex 6CCD
    address=2130_E(2)

2750 Hz tone: coefficient=Hex 6CCD
    address=2130_E(2)

For Example 4, the offset code for Table 3 is decimal 4 for the 2130 Hz tone and decimal 20 for the 2750 Hz tone. These offsets are added to the physical address of the first value in the table to provide the required scaling coefficients. They are incremented to supply the addresses of the frame energy to be used in the threshold test for frame 3. This would result in the parameters shown below:

2130 Hz tone: coefficient=Hex 22E4
    address=2130_E(2)

2750 Hz tone: coefficient=Hex 6CCE
    address=2130_E(1)

Again, since the same table is used for both the 2130 Hz and the 2750 Hz tone, the tone frame energies are stored in an array as discussed hereinabove, and an increment is added to the address retrieved from Table 3 for the 2130 Hz tone address to retrieve the correct address for the 2750 Hz tone.

Threshold Decision Tree

Once the scaling coefficient and energy value have been obtained from the data tables, they are multiplied together to generate the energy threshold value. The threshold values are compared to other energy values to determine if the threshold values are within an acceptable range. The comparison logic depends on whether noise is present in the frame and whether a frame energy dropout has occurred as shown in FIGS. 5 and 6. For frame 2 in the CAS example, blocks 500 and 508 in FIG. 5 shows that if no energy dropout has occurred in frame 1, E(1) should be used as the reference energy. However, in block 502, if noise was present in frame 1, this scaled value must be compared to the frame 0 energy E(0) to ensure that it is "in-range", i.e., less than 85% of the energy recorded in frame 0, because the recorded value may have been affected by the presence of noise energy at the specific frequencies being monitored by the detector.

If the energy threshold detection value $E_T(2)$ is "out-of-range" in block 516, then E(0) becomes the reference energy in block 510, where a scaled version of E(0) is then compared to a minimum threshold value $E_{MIN}$ in block 514 so that the final threshold value is not too small. Example 1 discussed hereinabove illustrates the case where no dropout has occurred and noise is present in frame 1. In this instance, the comparison involving E(1) followed by the comparison involving E(0) only occurs when the offset value from Table 2 is decimal 2. In the remaining 3 cases, the energy value is scaled by the coefficient and compared against the minimum threshold energy $E_{MIN}$ for that frame.

The number of potential comparisons required in frame 3 is greater than the number of potential comparisons for frame 2 due to the increased number of previous frames. For frame 3, there are 4 cases which require two comparisons of energy threshold detection values, corresponding to offset values of 10, 14, 20, and 22, and one case which requires three comparisons of energy threshold detection values, corresponding to an offset value of 6. In other applications of the present invention, especially when a greater number of frame portions are processed, the number of potential comparisons may increase appreciably.

Advantageously, the present invention uses the same control code for both the frame 2 and frame 3 cases for the CAS example as described hereinbelow. To simplify the process of comparison, the present invention embeds information regarding the number of comparisons required in the least significant bits of the scaling coefficients, which are retrieved according to the offset value into the data table. When two tones are to be detected, there are three types of comparisons that may be required, namely single, double, and triple comparisons. Therefore, two bits can be used to differentiate the 3 cases. A correspondingly greater number of the least significant bits may be used in cases where a greater number of frame portions are involved.

For the CAS example, as well as other cases where two tones are to be detected, the two least significant bits of the 16-bit coefficients are coded with control information required for decoding the number of comparisons in each frame. The two bits are defined as follows:

| Number of Comparisons | Bit 1 | Bit 0 |
|---|---|---|
| 1 | 0 | 0 |
| 2 | 1 | 0 |
| 3 | 0 | 1 |

Figure 8:
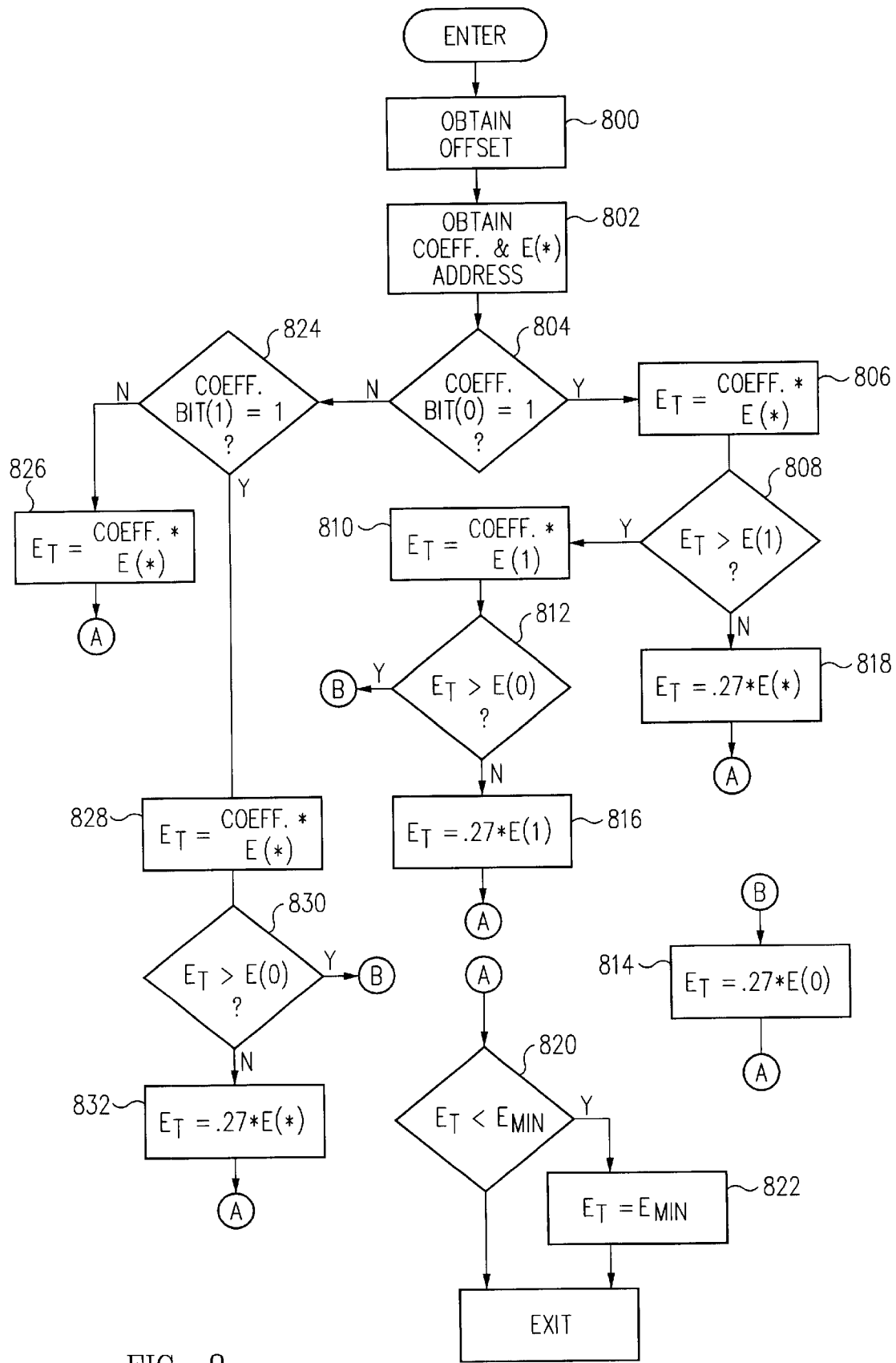
FIG. 8 is a flowchart diagram for determining energy threshold values based on a set of control flags embedded in the scaling coefficients.

FIG. 8 shows the use of these embedded bits. In block 800 and 802, the offset, scaling coefficient, and the address of the energy value from a previous frame are obtained. If bit 0 of the scaling coefficient is set, as shown in block 804, then three comparisons are required. First, the energy threshold detection value, $E_T$, is determined based on the scaling coefficient and the energy value from the previous frame, denoted as E(*), in block 806. In block 808, the energy threshold detection value is compared to the frame 1 energy value E(1) to determine if it is in-range. If $E_T$ is greater than E(1), then $E_T$ is out of range and E(1) is used to determine $E_T$ instead of E(*) in block 810. The second comparison occurs in block 812 where the energy threshold detection value is compared to the frame 0 energy value E(0) to determine if it is in-range. If $E_T$ is greater than E(0), then $E_T$ is based on a fractional portion of E(0) as shown in block 814. If $E_T$ is less than E(0), then $E_T$ is based on a fractional portion of E(1) as shown in block 816. Back to block 808, if $E_T$ is less than E(1), then ET is based on a fractional portion of E(*) as shown in block 818. After blocks 814, 816, and 818, the third comparison is made in block 820 between $E_T$ and minimum threshold energy $E_{MIN}$ for that frame. If $E_T$ is below $E_{MIN}$, $E_T$ is set to the minimum value in block 822.

If bit 0 is not set in block 804, then it is determined whether two comparisons are required by checking bit 1 in block 824. If bit 1 is not set, then $E_T$ is determined based on the scaling coefficient and the energy value from the previous frame E(*) in block 826 and no comparisons to previous frames are required. If bit 1 is set, then two comparisons are required. The energy threshold detection value, $E_T$, is first determined based on the scaling coefficient and the energy value from the previous frame, E(*), in block 828. In block 830, the first comparison occurs where the energy threshold detection value $E_T$ is compared to the frame 0 energy value E(0) to determine if it is in-range. If $E_T$ is greater than E(0), then $E_T$ is based on a fractional portion of E(0) as shown in block 814. If $E_T$ is less than E(0), then $E_T$ is based on a fractional portion of E(*) as shown in block 832. After block 832, the second comparison is made in block 820 between $E_T$ and minimum threshold energy $E_{MIN}$ for that frame. If $E_T$ is below $E_{MIN}$, $E_T$ is set to the minimum value in block 822.

The value used for scaling coefficient 0.27 as shown in blocks 816, 814, 818, and 832 was determined experimentally for the CAS example. Note that this value may change in one or more of the blocks, depending on characteristics of the input signal and the application in which the present invention is utilized.

In Table 2, the lsb's for the scaling coefficient corresponding to an offset of 2, i.e., hexadecimal 6CCE, are "10" indicating that two comparisons are required. The lsb's of scaling coefficients corresponding to offsets of 0, 4, and 6 are set to "00" indicating that a single comparison is required. Similarly, the lsb's for scaling coefficients stored at even address table offsets in Table 3 for the frame 3 parameters shows that for table offset 6, the lsb's of the corresponding scaling coefficient, hexadecimal 6CCD, are "01" indicating a 3-stage scale comparison is required. Scaling coefficients at even addresses 10, 14, 20, 22 have lsb's of "10" indicating 2 comparisons are required. The remaining scaling coefficients in Table 3 have lsb's set to "00" indicating 1 comparison is required.

In summary, for Examples 1 through 4 discussed hereinabove, the required number of comparisons for the two tones in each case are as follows:

Example 1:

| tone | coefficient | 2 lsb's | # of possible comparisons |
| --- | --- | --- | --- |
| 2130 Hz | 6CCE | 10 | 2 |
| 2750 Hz | 6CCE | 10 | 2 |

Example 2:

| tone | coefficient | 2 lsb's | # of possible comparisons |
| --- | --- | --- | --- |
| 2130 Hz | 6CCC | 00 | 1 |
| 2750 Hz | 6CCE | 10 | 2 |

Example 3:

| tone | coefficient | 2 lsb's | # of possible comparisons |
| --- | --- | --- | --- |
| 2130 Hz | 6CCD | 01 | 3 |
| 2750 Hz | 6CCD | 01 | 3 |

Example 4:

| tone | coefficient | 2 lsb's | # of possible comparisons |
| --- | --- | --- | --- |
| 2130 Hz | 22E4 | 00 | 1 |
| 2750 Hz | 6CCE | 10 | 2 |

Importantly, FIG. 8 may be used instead of FIGS. 5 and 6 to simplify the decision paths and to share decision logic between frame portions. Note also that FIG. 8 applies to frame portions that potentially require comparison of energy threshold detection values with multiple previous energy values, such as frames 2 and 3 in the CAS example. For frame portions requiring fewer comparisons, decisions paths such as those shown in FIGS. 3 and 4 for frames 0 and 1 in the CAS example, are used.

The present invention provides a robust method and apparatus for detecting one or more tones in an input signal that may include noise components. The CAS example illustrated application of the present invention to a situation where a DTMF signal included a noise signal which would otherwise interfere with detection of the CAS tones. While the CAS example has been illustrated extensively herein, the present method and apparatus may be applied to detectors receiving MTMF signals having more than two tones to be detected, one or more noise signals, and tones having different frequencies and duration than the CAS tones. Dynamic determination of energy threshold detection levels are performed individually for all of the tones to be detected. The scaling coefficients used in the CAS example may vary for other applications according to the input signals and performance of the system in which the present invention is applied. The components for the present invention for signal tone detector 200 may be implemented in hardware, software, firmware, or a combination of hardware, software and firmware. A known data processor, such as a microprocessor-based computer, as well as other hardware, firmware, and software devices, may be used to implement the present invention.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the tone detector, as defined by the following claims.

What is claimed is:

1. A method for determining energy threshold detection values for detecting at least one tone having a known frequency and duration in an input signal, the input signal being input over a period of time, the period of time being divided into frame portions including at least an initial frame portion and a last frame portion, an energy value being determined for the at least one tone during each frame portion, the method comprising:

generating data signals thereby defining a data table including scaling coefficients and addresses of the energy values for at least two frame portions;

setting control flag signals defining a control word for the at least two frame portions, the control flag signals being set based on the energy values being below a threshold value in previous frame portions, and the presence of noise in previous frame portions;

determining an offset into the data table based on the control word; and retrieving a scaling coefficient and an address of an energy value from the data table based on the offset.

2. The method, as recited in claim 1, wherein the addresses of the energy values point to locations wherein the energy values for the at least one tone reside.

3. The method, as recited in claim 2, further comprising storing the scaling coefficients and addresses of the energy values in a predetermined order in consecutive locations in a memory.

4. The method, as recited in claim 1, further comprising determining the energy threshold detection value for the initial frame portion based on an expected energy level and whether noise is present in the input signal.

5. The method, as recited in claim 1, wherein the known duration of the at least one tone is divided into at least four frame portions of substantially equal duration, further comprising:

determining the energy threshold detection value for the second frame portion based on a scaled value of the energy value from the initial frame portion.

6. The method, as recited in claim 5, further comprising:

using selected bits in the control word to determine the offset for the third frame portion; and determining the energy threshold detection value for the third frame portion by using the scaling coefficient to scale the energy value, the scaling coefficient and the energy value being retrieved from the data table using the offset for the third frame portion.

7. The method, as recited in claim 6, further comprising:

using selected bits in the control word to determine the offset for the fourth frame portion; and determining the energy threshold detection value for the fourth frame portion by using the scaling coefficient to scale the energy value, the scaling coefficient and the energy value being retrieved from the data table using the offset for the fourth frame portion.

8. The method, as recited in claim 5, further comprising:
using selected bits in the control word to determine the offset for the third frame portion;
determining the energy threshold detection value for the third frame portion by using the scaling coefficient to scale the energy value, the scaling coefficient and the energy value being retrieved from the data table using the offset for the third frame portion;
using other selected bits in the control word to determine the offset for the fourth frame portion; and
determining the energy threshold detection value for the fourth frame portion by using the scaling coefficient to scale the energy value, the scaling coefficient and the energy value being retrieved from the data table using the offset for the fourth frame portion.

9. The method, as recited in claim 8, further comprising:
setting a second set of control flag signals based on the number of comparisons against previous frame values required to determine the energy threshold detection values for the third and fourth frame portions, the second set of control flag signals being set based on the presence of noise and on the energy values being below a threshold value in previous frame portions.

10. The method, as recited in claim 9, further comprising:
comparing the energy threshold detection value for the third frame portion to previous energy values based on the second set of control flag signals.

11. The method, as recited in claim 9, further comprising:
comparing the energy threshold detection value for the fourth frame portion to previous energy values based on the second set of control flag signals.

12. A method for determining energy threshold detection values for detecting a plurality of tones having known frequencies and duration in an input signal, the input signal being input over a period of time, the period of time being divided into at least four substantially equal frame portions, energy values being determined for at least two of the tones during each frame portion, the method comprising:
generating a data table including scaling coefficients and addresses of the energy values for each frame, the scaling coefficients being predetermined;
setting control flag signals in a control word, each of the at least two tones having a corresponding control word, the control flag signals being set based on whether the energy values are below a threshold value in previous frame portions, and the presence of noise in previous and current frame portions;
determining offsets into the data table based on the control words; and
retrieving scaling coefficients and energy values from the data table based on the offsets, the scaling coefficients and energy values being used to generate energy threshold detection values for the at least two tones.

13. The method, as recited in claim 12, wherein the addresses of the energy values point to locations wherein the energy values for the at least two tones reside.

14. The method, as recited in claim 13, wherein the scaling coefficients and addresses of the energy values are stored in a predetermined order in consecutive memory locations.

15. The method, as recited in claim 12, further comprising determining the energy threshold detection value for the first frame portion based on an expected energy level and whether noise is present in the input signal.

16. The method, as recited in claim 12 further comprising determining the energy threshold detection value for the second frame portion based on a scaled value of the energy value for the first frame portion.

17. The method, as recited in claim 12, further comprising:
using selected bits in the control word to determine the offset for the third frame portion; and
determining the energy threshold detection value for the third frame portion by using the scaling coefficient to scale the energy value, the scaling coefficient and the energy value being retrieved from the data table using the offset for the third frame portion.

18. The method, as recited in claim 12, further comprising:
using selected bits in the control word to determine the offset for the fourth frame portion; and
determining the energy threshold detection value for the fourth frame portion by using the scaling coefficient to scale the energy value, the scaling coefficient and the energy value being retrieved from the data table using the offset for the fourth frame portion.

19. The method, as recited in claim 12, further comprising:
using selected bits in the control word to determine the offset for the third frame portion;
determining the energy threshold detection value for the third frame portion by using the scaling coefficient to scale the energy value, the scaling coefficient and the energy value being retrieved from the data table using the offset for the third frame portion;
using other selected bits in the control word to determine the offset for the fourth frame portion; and
determining the energy threshold detection value for the fourth frame portion by using the scaling coefficient to scale the energy value, the scaling coefficient and the energy value being retrieved from the data table using the offset for the fourth frame portion.

20. The method, as recited in claim 19, further comprising:
setting a second set of control flag signals in the least significant bits of the scaling coefficients based on the number of comparisons against previous frame values required to determine the energy threshold detection value for the third and fourth frame portions, the second set of control flag signals being set based on the presence of noise and on the energy values being below a threshold value in previous frame portions;
determining the energy threshold detection value for the third frame by comparing the energy threshold detection value for the third frame portion to previous energy values based on the second set of control flag signals; and
determining the energy threshold detection value for the fourth frame by comparing the energy threshold detection value for the fourth frame portion to previous energy values based on the second set of control flag signals.

21. An apparatus for determining energy threshold detection values for detecting at least one tone having a known frequency and duration in an input signal, the input signal being input over a period of time, the period of time being divided into frame portions including at least an initial frame portion and a last frame portion, an energy value being determined for the at least one tone during each frame portion, the apparatus comprising:
a signal processor coupled to receive the energy values and output data signals thereby defining a data table including scaling coefficients and addresses of the energy values for at least two frame portions, the signal processor further outputting a set of control flag signals for the at least two frame portions, the control flag signals being set based on the energy values being below a threshold value in previous frame portions, and the presence of noise in previous frame portions; and a threshold determiner coupled to receive the control flag signals, the threshold determiner being operable to determine an offset into the data table based on the control flag signals and to retrieve a scaling coefficient and an address of an energy value from the data table based on the offset.

22. The apparatus, as recited in claim 21, wherein the addresses of the energy values point to locations wherein the energy values for the at least one tone reside.

23. The apparatus, as recited in claim 22, further comprising a memory and wherein the scaling coefficients and addresses of the energy values are stored in a predetermined order in consecutive locations in the memory.

24. The apparatus, as recited in claim 21, wherein the energy threshold detection value for the initial frame portion is based on an expected energy level and whether noise is present in the input signal.

25. The apparatus, as recited in claim 21, wherein the known duration of the tone is divided into at least four frame portions of substantially equal duration, the energy threshold detection value for the second frame portion being based on a scaled value of the energy value from the initial frame portion.

26. The apparatus, as recited in claim 21, wherein the offset comprises selected control flag signals, and the energy threshold detection value for the third frame portion is determined using the scaling coefficient to scale the energy value, the scaling coefficient and the energy value being retrieved from the data table using the offset for the third frame portion.

27. The apparatus, as recited in claim 21, wherein selected control flag signals are used to determine the offset for the fourth frame portion, and the energy threshold detection value for the fourth frame portion is determined using the scaling coefficient to scale the energy value, the scaling coefficient and the energy value being retrieved from the data table using the offset for the fourth frame portion.

28. The apparatus, as recited in claim 21, further comprising a second set of control flag signals, the second set of control flag signals being set based on the number of comparisons against previous frame values required to determine the energy threshold detection values for the third and fourth frame portions.

29. A system for detecting at least one tone having a known frequency and duration in an input signal, the input signal being input over a period of time, the period of time being divided into substantially equal frame portions, the system comprising:

means for generating energy values indicative of the energy of the input signal during each frame portion;

means for generating energy values indicative of the energy of the at least one tone during each frame portion;

a signal filter coupled to receive the energy values and output noise indicators for each frame portion based on the energy values;

a dynamic threshold determiner which generates an energy threshold for each frame portion based on a value of the energy value for the at least one tone, the dynamic threshold determiner being operable to:

generate data signals thereby defining a data table including scaling coefficients and addresses of the energy values for at least one frame portion, generate a control word for the at least one frame portion, the control word being defined by control flag signals being set based on the energy values being below a threshold value in previous frame portions and the presence of noise in previous frame portions;

determine an offset into the data table based on the control word;

retrieve a scaling coefficient and an address of an energy value from the data table based on the offset; and a signal processor coupled to receive the energy thresholds, the noise indicators, and the energy values, and which determines when the input signal includes the at least one tone based on the energy threshold, the noise indicator, and the energy value.

30. The system, as set forth in claim 29, wherein the addresses of the energy values point to locations wherein the energy values for the at least one tone reside.

31. The system, as recited in claim 30, further comprising a memory and wherein the scaling coefficients and addresses of the energy values are stored in a predetermined order in consecutive locations in the memory.

32. The system, as recited in claim 29, wherein the dynamic threshold determiner is further operable to determine the energy threshold detection value for the first frame portion based on an expected energy level and whether noise is present in the input signal.

33. The system, as recited in claim 29, wherein the known duration of the at least one tone is divided into at least three frame portions of substantially equal duration, and the dynamic threshold determiner is further operable to determine the energy threshold detection value for the second frame portion based on a scaled value of the energy value from the initial frame portion.

34. The system, as recited in claim 29, wherein the dynamic threshold determiner is further operable to:

mask selected bits in the control word to determine the offset for the third frame portion; and determine the energy threshold detection value for the third frame portion by using the scaling coefficient to scale the energy value, the scaling coefficient and the energy value being retrieved from the data table using the offset for the third frame portion.

35. The system, as recited in claim 34, wherein the dynamic threshold determiner is further operable to:

set a second set of control flag signals based on the number of comparisons against previous frame values required to determine the energy threshold detection values for the third frame portion, the second set of control flag signals being set based on the presence of noise and on the energy values being below a threshold value in previous frame portions.

36. The system, as recited in claim 35, wherein the dynamic threshold determiner is further operable to:

compare the energy threshold detection value for the third frame portion to previous energy values based on the second set of control flag signals.

37. The system, as recited in claim 35, wherein the dynamic threshold determiner is further operable to:

compare the energy threshold detection value for the fourth frame portion to previous energy values based on the second set of control flag signals.

38. The system, as recited in claim 35, wherein the second set of control flag signals are located in the least significant bits of the scaling coefficients.

* * * * *